(12) United States Patent
Soby et al.

(10) Patent No.: US 8,904,541 B2
(45) Date of Patent: Dec. 2, 2014

(54) PERFORMING SECURITY ASSESSMENTS IN AN ONLINE SERVICES SYSTEM

(75) Inventors: Brian Soby, Emeryville, CA (US); Robert Fly, Moraga, CA (US)

(73) Assignee: salesforce.com, inc., San Francisco, CA (US)

( * ) Notice: Subject to any disclaimer, the term of this patent is extended or adjusted under 35 U.S.C. 154(b) by 88 days.

(21) Appl. No.: 12/869,680

(22) Filed: Aug. 26, 2010

(65) Prior Publication Data

US 2012/0054871 A1 Mar. 1, 2012

(51) Int. Cl.
*G06F 11/36* (2006.01)
*G06F 21/00* (2013.01)

(52) U.S. Cl.
CPC ........ *G06F 11/3688* (2013.01); *G06F 11/3664* (2013.01); *G06F 21/00* (2013.01)
USPC ............................................. 726/25; 717/126

(58) Field of Classification Search
None
See application file for complete search history.

(56) References Cited

U.S. PATENT DOCUMENTS

| | | | |
|---|---|---|---|
| 5,339,431 A * | 8/1994 | Rupp et al. .................... | 717/162 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,502,102 B1 * | 12/2002 | Haswell et al. ........................ | 1/1 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,560,776 B1 * | 5/2003 | Breggin et al. ............... | 717/176 |
| 6,574,635 B2 | 6/2003 | Stauber et al. | |

(Continued)

*Primary Examiner* — Michael R Vaughan
(74) *Attorney, Agent, or Firm* — Ingrassia Fisher & Lorenz, P.C.

(57) ABSTRACT

A system and method for performing security assessments in an online services system. In one embodiment, a method includes receiving an accepted security assessment agreement from a user, where the security assessment agreement is associated with a software application utilized in an online services system. The method also includes receiving configuration data associated with the software application; receiving scanning data associated with the software application; and sending the configuration data and scanning data to one or more security assessment systems.

17 Claims, 4 Drawing Sheets

(56) References Cited

U.S. PATENT DOCUMENTS

| | | |
|---|---|---|
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,766,481 B2* | 7/2004 | Estep et al. ............... 717/124 |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,862,696 B1* | 3/2005 | Voas et al. ............... 714/38.11 |
| 7,062,502 B1 | 6/2006 | Kesler |
| 7,340,411 B2 | 3/2008 | Cook |
| 7,389,216 B2* | 6/2008 | Parent et al. ............... 703/21 |
| 7,398,516 B2* | 7/2008 | Berg et al. ............... 717/126 |
| 7,401,094 B1 | 7/2008 | Kesler |
| 7,552,480 B1* | 6/2009 | Voss ............... 726/25 |
| 7,620,655 B2 | 11/2009 | Larsson et al. |
| 7,698,160 B2 | 4/2010 | Beaven et al. |
| 7,802,089 B2* | 9/2010 | Snover et al. ............... 713/152 |
| 8,024,807 B2* | 9/2011 | Hall et al. ............... 726/25 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0212909 A1* | 11/2003 | Chandrashekhar et al. .. 713/201 |
| 2003/0225730 A1 | 12/2003 | Warner et al. |
| 2004/0001092 A1 | 1/2004 | Rothwein et al. |
| 2004/0006704 A1* | 1/2004 | Dahlstrom et al. ............ 713/200 |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0169591 A1* | 9/2004 | Erkkinen ............... 340/945 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0043956 A1* | 2/2007 | El Far et al. ............... 713/189 |
| 2007/0168970 A1* | 7/2007 | Li et al. ............... 717/124 |
| 2009/0049553 A1* | 2/2009 | Vasudeva ............... 726/25 |
| 2010/0115601 A1* | 5/2010 | Brandstetter et al. ............ 726/11 |
| 2010/0180260 A1* | 7/2010 | Chikkadevaiah et al. .... 717/125 |
| 2010/0333168 A1* | 12/2010 | Herrod ............... 726/1 |
| 2011/0185231 A1* | 7/2011 | Balestrieri et al. ............ 714/27 |
| 2012/0042383 A1* | 2/2012 | Greene et al. ............... 726/25 |
| 2012/0042384 A1* | 2/2012 | Badhwar et al. ............ 726/25 |
| 2012/0054222 A1* | 3/2012 | Soby ............... 707/769 |
| 2012/0072968 A1* | 3/2012 | Wysopal et al. ............... 726/1 |

* cited by examiner

US 8,904,541 B2

PERFORMING SECURITY ASSESSMENTS IN AN ONLINE SERVICES SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to security in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Cloud service providers utilize database systems to provide resources to its customers as a service. A cloud service provider may perform tests in order to ensure the security of its infrastructure and software. Such tests may be time consuming and costly.

BRIEF SUMMARY

Embodiments provide mechanisms and methods for performing security assessments in an online services system. In one embodiment, a method includes receiving an accepted security assessment agreement from a user, where the security assessment agreement is associated with a software application utilized in an online services system. The method also includes receiving configuration data associated with the software application; receiving scanning data associated with the software application; and sending the configuration data and scanning data to one or more security assessment systems.

While embodiments of the present invention may be implemented in a system having an application server providing a front end for an on-demand database service capable of supporting multiple tenants, the present invention is not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for performing security assessments in an online services system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing performing security assessments in an online services system will be described with reference to example embodiments.

System Overview

Figure 1:
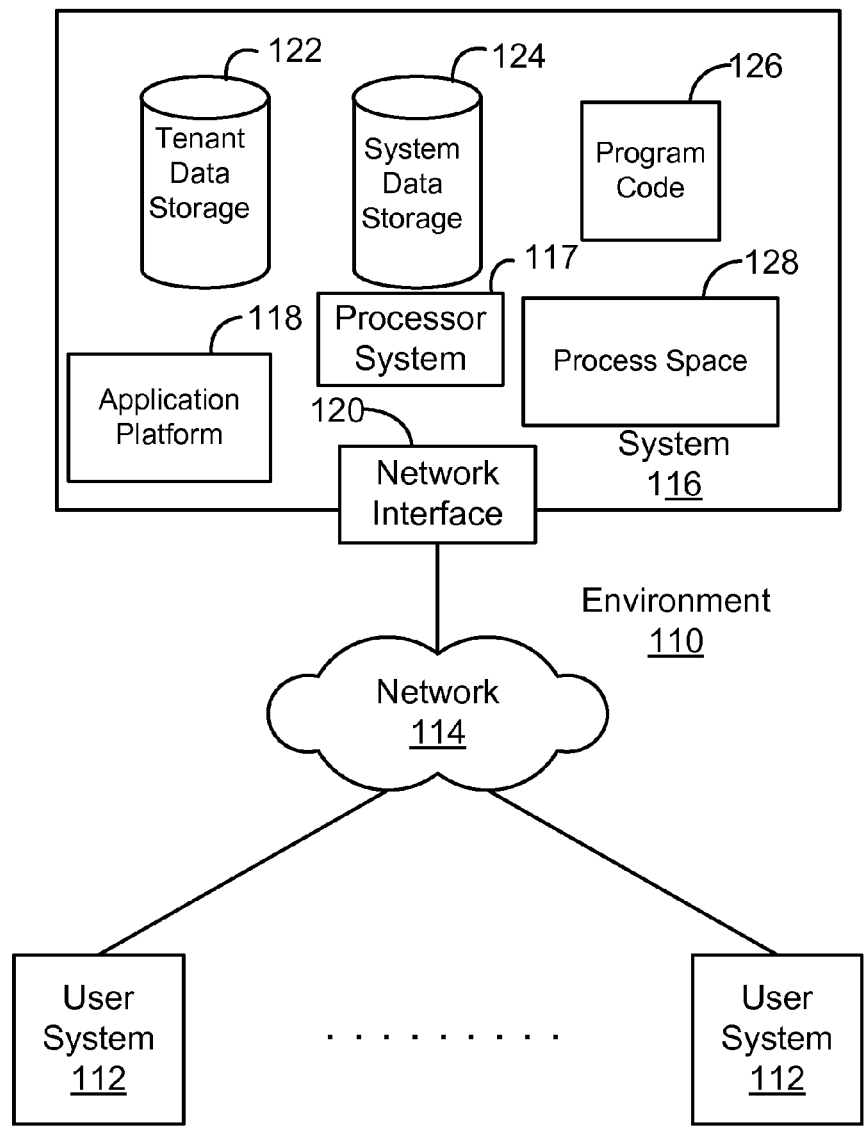
FIG. 1 illustrates a block diagram of an example environment wherein an online services system might be used, and which may be used to implement the embodiments described herein.

FIG. 1 illustrates a block diagram of an example environment 110 where an online services system might be used, and which may be used to implement the embodiments described herein. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116. System 116 may also be referred to as an online services system or cloud service provider. System 116 provides its resources to customers (e.g., end users) as a service.

An on-demand database service, such as system 116, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creating, managing, and executing one or more applications developed by either the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as to provide related data, code, forms, webpages and other information to and from user systems 112. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third-party application developer) software applications, which may or may not include CRM, may be supported by the application platform 118, which manages the creation and storage of the applications into one or more database objects, and executing of the applications in a virtual machine in the process space of the system 116. The terms software application and application are used interchangeably.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application (s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
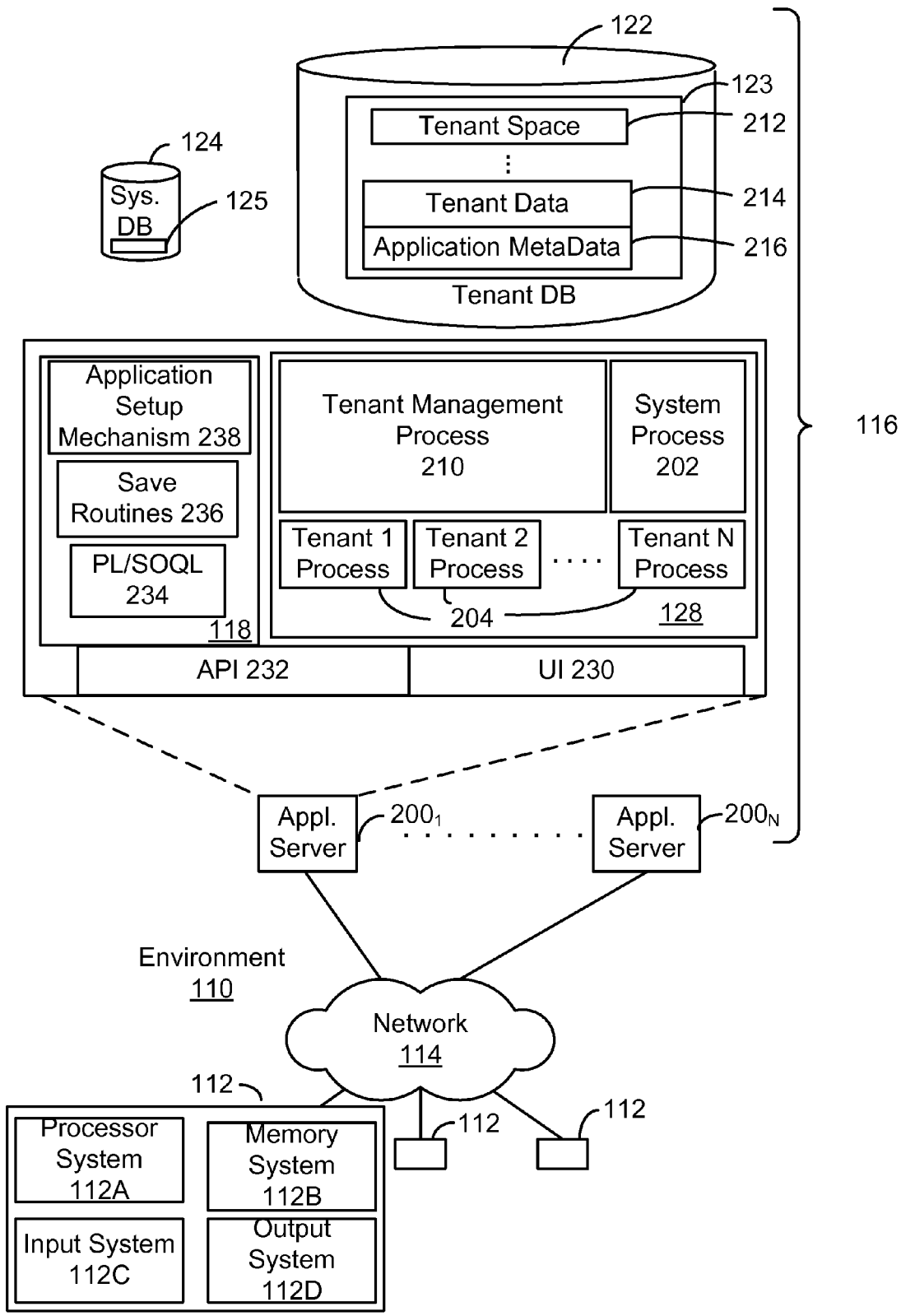
FIG. 2 illustrates a block diagram of another example environment, which may be used to implement the embodiments described herein.

FIG. 2 illustrates a block diagram of another example environment 110, which may be used to implement the embodiments described herein. FIG. 2 also illustrates elements of system 116 and various interconnections, according to one embodiment. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, user interface (UI) 230, application program interface (API) 232, PL/Salesforce.com object query language (PL/SOQL) 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown in FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes and to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210, for example. Invocations to such applications may be coded using PL/SOQL 234 that provides a programming language style interface extension to API 232. Invocations to applications may be detected by one or more system processes, which manage retrieving application metadata 216 for the subscriber, making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer control protocol and Internet protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles the storage of, and access to, different objects, data and applications across disparate users and organizations.

As an example of storage, one tenant might be a company that employs a sales force where each salesperson uses system 116 to manage his or her sales process. Thus, a user might maintain contact data, leads data, customer follow-up data, performance data, goals and progress data, etc., all applicable to that user's personal sales process (e.g., in tenant data storage 122). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 700 in system 116) automatically generates one or more structured query language (SQL) statements (e.g., one or more SQL queries) that are designed to access the desired information. System data storage 124 may generate query plans to access the requested data from the database.

Embodiments described herein enable, facilitate, and manage security testing of aspects of an online services system. Such aspects include security assessments of software applications provided by third-party developer as well as other security assessments with the online services system. Security assessments includes network and software application analysis ensure the security of infrastructure of the online services system and software applications used by the online services system. Some providers strictly forbid this type of testing, while others have a lengthy process for completing this type of testing. This system describes an automated way to enable, facilitate and manage the security reviews of an on demand system.

Figure 3:
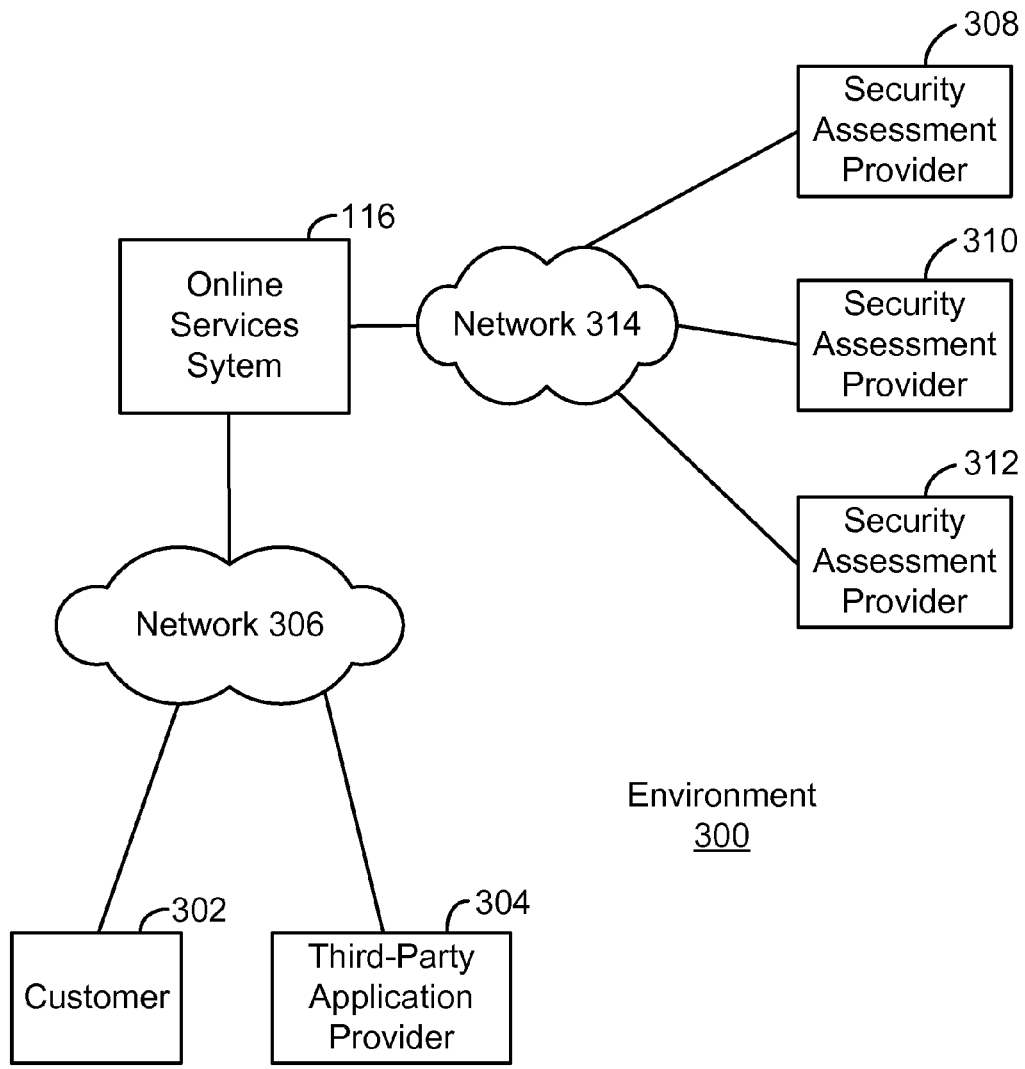
FIG. 3 illustrates a block diagram of another example environment, which may be used to implement the embodiments described herein.

FIG. 3 illustrates a block diagram of another example environment 300, which may be used to implement the embodiments described herein. As shown in FIG. 3, environment 300 includes an online service system (e.g., system 116), which communicates with one or more customers 302 and one or more third-party application providers 304 via a network 306. System 116 may perform security assessments internally and/or may utilize resources and services externally from security assessment providers 308, 310, and 312 via a network 314. For ease of illustration, only three security assessment providers are shown. There may be more security assessment providers available, depending on the specific implementation. In one embodiment, networks 306 and 314 may include the Internet and/or other suitable networks.

In one embodiment, system 116 provides an application exchange (e.g., AppExchange), where partners (e.g., third-party application providers 304) may provide applications and be listed on the application exchange. As described in more detail below, system 116 receives from the third-party application providers' information (e.g., configuration data and scanning data) associated with their applications and related testing requirements. This information enables system 116 to automatically perform the security assessments described herein on an ongoing basis (e.g., reoccuring) or as needed. The frequency of the security assessments may vary (e.g., every month, every year, etc.). Also, in one embodiment, the frequency of the security assessments may depend on security vulnerability risks (e.g., low risk, medium risk, high risk, etc.). For example, a given application with a significantly large number of users may be assigned a higher risk value, and thus may be tested more frequently (e.g., monthly).

As indicated above, security assessment providers 308-312 provide security assessments on applications provided by the third-party application providers 304. These assessments may include assessments and analysis for security vulnerabilities that the third-party applications may cause (e.g., within system 116 and/or associated with customers 302). The assessments may test integration components of applications that third-party application providers run on system 116, as well as any external components used to support the applications. The security assessments may also provide data used to determine security risks associated with a given application.

Figure 4:
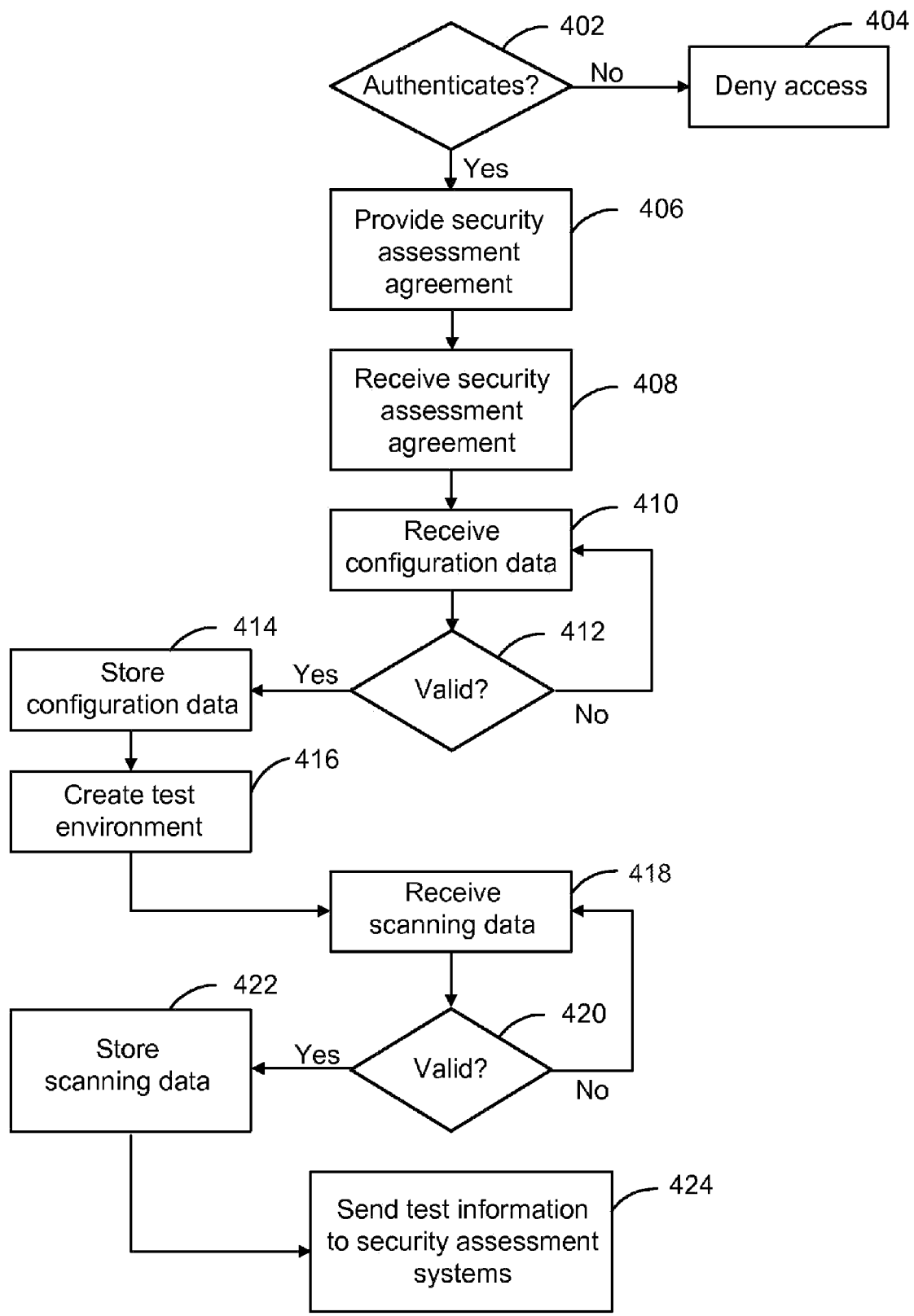
FIG. 4 illustrates an example simplified flow diagram for performing security assessments in an online services system.

FIG. 4 illustrates an example simplified flow diagram for performing security assessments in an online services system. Referring to both FIGS. 3 and 4, the method is initiated in block 402, where the system 116 authenticates the user (e.g., third-party application provider). In one embodiment, the authentication occurs when the user logs in. The authentication process determines whether the user is a registered partner. In block 404, system 116 denies access if authentication was not successful. While system 116 may be described as performing the steps as described in the embodiments herein, any suitable component or combination of components of system 116 may perform the steps described. For example, the steps may be performed by processor system 117 or process space 128 of FIG. 1, by system process 202 of FIG. 2, or by any other suitable processor or processors associated with system 116.

In block 406, system 116 provides a security assessment agreement with the user if authentication was successful. In one embodiment, system 116 displays the security assessment agreement to the user. In one embodiment, the security assessment agreement is an agreement in which the user (e.g., third-party application provider) permits security assessments of the user's application. In one embodiment, the security assessment agreement is required in order to allow the application provider to use the services of the online services system (e.g., system 116). In one embodiment, the security assessment agreement also includes terms agreed to by parties performing the assessments.

In block 408, system 116 receives the accepted security assessment agreement from the user. In one embodiment, system 116 receives the accepted security assessment agreement when the user indicates (e.g., checking an acceptance box) online that the user accepts the agreement. In one embodiment, system 116 enables the user to submit a request for changes and/or updates to the security assessment agreement. In one embodiment, the changes may be received by email. Once received, an administrator or other appropriate individual may approve the change, notify the user of the approval, and save the modified agreement. In one embodiment, the modified security assessment agreement received from the user may be considered an accepted form of the agreement.

In block 410, system 116 receives configuration data from the user. The configuration data may also be referred to as configuration metadata. In one embodiment, the configuration data includes testing parameters and requirements for performing security assessments on an application. For example, in one embodiment, the configuration data may include: the testing permitted (e.g., Boolean); a testing window start time (e.g., Greenwich Mean Time [GMT] Time); a testing window end time (e.g., GMT Time); allowed tools (e.g., Enum [set of constant values], tools allowed by the provider, etc.); testing allowed (e.g., Enum—all, network or application; require signed agreement (e.g., Boolean); testing frequency (e.g., Enum—(once, yearly, quarterly, etc.); providers used (Enum—current service provider list), any other information needed to test an application, etc.

In block 412, system 116 determines if the configuration data is valid. If not, system 116 allows the user to correct the configuration data. In block 414, system 116 stores the configuration data onto a storage device if the configuration data is valid.

In block 416, system 116 creates a test environment for performing security assessments on the application if the configuration data is valid. In one embodiment, the test environment is based on the configuration data. In one embodiment, the test environment may be a new "instance" for an organization and would be configured accordingly. In one embodiment, the test environment may be a copy of an existing test environment. In one embodiment, the copy of the test environment may have a configuration for a production system, where no data would be present, but the configuration would be the same. In one embodiment, the creation of the test environment is conditioned upon receiving the accepted security analysis agreement from the user. In one embodiment, the results of the test environment are communicated internally and externally as appropriate. In one embodiment, a security service provider may review the test results. In one embodiment, the security service provider may identify aspects such as out-of-date software, web vulnerabilities such as cross-site scripting (XSS) vulnerabilities, etc.

In block 418, system 116 receives scanning data from the user. The scanning data may also be referred to as scanning metadata. In one embodiment, the scanning data provides access information including access credentials needs for testing a target applications. In one embodiment, the scanning data may include the following information: tool provider, testing window, URL to test, site login user, site login password, Internet protocol (IP) addresses to test (e.g., in the cloud provider's space), provider login user, provider login password, source IP, and any other access information needed to test an application, etc. In one embodiment, some of the scanning data may be copied from the configuration data. In block 420, system 116 determines if the scanning data is valid. If not, system 116 allows the user to correct the scanning data. In block 422, system 116 stores the scanning data onto a storage device.

In block 424, system 116 sends the test information to one or more appropriate security assessment systems (e.g., systems internal to the cloud provider, or external systems that provide security assessments such as security assessment providers 308, 310, and 312). In one embodiment, system 116 communicates with the security assessment providers via an application programming interface (API) to provide the test information. This exchange of information also schedules security assessments to occur automatically at an appropriate time.

In one embodiment, system 116 stores the results of the security assessments to a results repository or any other suitable storage location. System 116 may later retrieve the results for delivery and review by an appropriate administrator of the cloud provider, software application provider, end user, customer, prospect, and/or any other appropriate user.

In one embodiment, system 116 parses the results into individual records. In one embodiment, system 116 may label the individual records as: fixed, not fixed, false positive or accept risk, etc. In one embodiment, when an issue is marked as fixed, a simple retest is kicked off using automation may be used by system 116 to test that the issue was indeed resolved.

In one embodiment, system 116 determines if any systems under test (e.g., servers or other components of system 116) communicate with an unauthorized computer system (e.g., any external systems in violation of a policy). In order to do this, references to an external system (e.g., a recording system) are sent to the system under test in a variety of different ways. In one embodiment, each reference contains a token that can later be traced back to the system under test and the specific mechanism used to insert the individual reference containing the token. In one embodiment, the "recording/auditing system" may be the external system that serves as the target of all of these references and the recording/auditing system records every attempt to communicate with or retrieve any reference. In one embodiment, the reference includes information that uniquely identifies each request to its source computer system. In one embodiment, the "source computer system" may be an individual system under test (multiple systems may be tested at the same time) and/or a specific mechanism used to insert a reference that violates a policy (multiple references may be inserted using a variety of techniques). The reference can be in the form of a URL, IP address, or other similar system indicator, etc.

In one embodiment, system 116 generates a token for each request. A token may be in the form of a random character string, unique URL, port number, or similar unique indicator, etc. In one embodiment, system 116 may issue reference-token combinations to computer systems that are not authorized communication destinations, and maintain a record of the recipient of each reference-token combination. In one embodiment, an unauthorized computer system is a system that has established communication against policy. For example, in one embodiment, a policy may be that a system is permitted to use only a pre-defined set of systems as authentication providers. If a user specifies a system outside of that set that they wish to be authenticated against, the system under test should reject the request. If a reference to the recording/auditing system is sent to the system under test, and the recording/auditing system is being suggested as the authentication provider, system 116 may later look at the recording/auditing system to determine if the system under test communicated with the recording/auditing system. If so, system 116 would know that the system under test has violated the policy by communicating with a system outside of the pre-defined set of authentication systems.

The reference-token combinations and records associated with an unauthorized computer system may be maintained and stored in a database or in any suitable storage location. In one embodiment, system 116 may record all communications with a given unauthorized computer system, and may generate reports associated with the unauthorized computer system. The method further comprises maintaining a record of unauthorized computer systems that have established communication against a policy.

In one embodiment, system 116 facilitates security assessments of software applications running on an on-demand system where data elements and fields can contain unknown data types and content, or where data type and content can vary based upon an individual customer configuration in a multi-tenant environment. In one embodiment, during code analysis, the installation or intended runtime environment for the code is queried dynamically to resolve data fields referenced in the code to determine their data type or validation logic. An analysis tool may then use this information to determine if the validation or data type would make the usage of the field resistant to vulnerabilities that could exist if the field was not validated or allowed any data to be stored.

In one embodiment, services may allow customers to upload arbitrary HTML or software code to be executed by system 116 in the context of the customers' organizations. When performing static analysis of the software application for security purposes, data objects or fields referenced in data code are of known data types in order for the security software to accurately report of any vulnerabilities that the software application may contain. Because customers may have created new data elements or changed existing elements, data type resolution may occur at runtime. System 116 dynamically resolves the data types against specific instances of a customer's on-demand service to resolve data fields and objects as they are defined by that customer, and system 116 considers the results in the security assessment of software.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for facilitating security assessments in an online services environment, the method comprising:
   receiving, in an online services system, from a third-party application provider, a software application for utilization in the online services system;
   receiving, at a processor in the online services system from the third-party application provider, configuration data associated with a security assessment to be performed on the software application for utilization in the online services system, the configuration data comprising testing parameters for testing the software application and requirements for starting the security assessment on the software application;
   determining, in the online services system, whether the configuration data is valid;
   receiving, in the online services system from the third-party application provider, scanning data associated with the software application, the scanning data comprising access credentials for performing the security assessment on the software application;
   sending, by the online services system, the configuration data and scanning data to one or more security assessment systems such that the one or more security assessment systems performs the security assessment of the software application in accordance with the configuration data and the scanning data; and
   receiving the security assessment in the online services system from the one or more security assessment systems.

2. The method of claim 1, further comprising dynamically resolving data referenced in the software application during the security assessment to detect vulnerabilities associated therewith, and wherein the vulnerabilities associated with the data referenced in the software application includes at least one of a validation logic vulnerability and a data type vulnerability.

3. The method of claim 1, further comprising creating, in the online services system, a test environment for performing security assessments on the software application.

4. The method of claim 1, further comprising creating, in the online services system, a test environment for performing security assessments on the software application, wherein the test environment is based on the configuration data.

5. The method of claim 1, further comprising determining if the online services system communicates with an unauthorized computer system.

6. The method of claim 1, further comprising creating, in the online services system, a test environment for performing security assessments on the software application, wherein creating the test environment is conditioned upon receiving a security assessment agreement.

7. A non-transitory computer-readable storage medium having one or more instructions thereon for facilitating security assessments in an online services system, the instructions when executed by a processor causing the processor to:
   receive, in an online services system, from a third-party application provider, a software application for utilization in the online services system;
   receive, at a processor in the online services system from the third-party application provider, configuration data associated with a security assessment to be performed on the software application for utilization in the online services system, the configuration data comprising testing parameters for testing the software application and requirements for starting the security assessment on the software application;
   determine, in an online services system, whether the configuration data is valid;
   receive, in the online services system from the third-party application provider, scanning data associated with the software application, the scanning data comprising access credentials for performing the security assessment on the software application;
   send, by the online services system, the configuration data and scanning data to one or more security assessment systems such that the one or more security assessment systems performs the security assessment of the software application in accordance with the configuration data and the scanning data; and receive the security assessment in the online services system from the one or more security assessment systems.

8. The computer-readable storage medium of claim 7, wherein the instructions further cause the processor to dynamically resolve data referenced in the software application during the security assessment to detect vulnerabilities associated therewith, and wherein the vulnerabilities associated with the data referenced in the software application includes at least one of a validation logic vulnerability and a data type vulnerability.

9. The computer-readable storage medium of claim 7, wherein the instructions further cause the processor to create, in the online services system, a test environment for performing security assessments on the software application.

10. The computer-readable storage medium of claim 7, wherein the instructions further cause the processor to create, in the online services system, a test environment for performing security assessments on the software application, wherein the test environment is based on the configuration data.

11. The computer-readable storage medium of claim 7, wherein the instructions further cause the processor to determine if the online services system communicates with an unauthorized computer system.

12. The computer-readable storage medium of claim 7, wherein the instructions further cause the processor to create, in the online services system, a test environment for performing security assessments on the software application, wherein creating the test environment is conditioned upon receiving a security assessment agreement.

13. An apparatus for facilitating security assessments in an online services system, the apparatus comprising:

a processor; and a storage device storing one or more stored sequences of instructions which when executed by the processor cause the processor to:

receive, in an online services system, from a third-party application provider, a software application for utilization in the online services system;

receive, at a processor in the online services system from the third-party application provider, configuration data associated with a security assessment to be performed on the software application for utilization in the online services system, the configuration data comprising testing parameters for testing the software application and requirements for starting the security assessment on the software application;

determine, in an online services system, whether the configuration data is valid;

receive in the online services system from the third-party application provider, scanning data associated with the software application, the scanning data comprising access credentials for performing the security assessment on the software application; and send, by the online services system, the configuration data and scanning data to one or more security assessment systems such that the one or more security assessment systems performs the security assessment of the software application in accordance with the configuration data and the scanning data; and receive the security assessment in the online services system from the one or more security assessment systems.

14. The apparatus of claim 13, wherein the instructions further cause the processor to dynamically resolve data referenced in the software application during the security assessment to detect vulnerabilities associated therewith, and wherein the vulnerabilities associated with the data referenced in the software application includes at least one of a validation logic vulnerability and a data type vulnerability.

15. The apparatus of claim 13, wherein the instructions further cause the processor to create, in the online services system, a test environment for performing security assessments on the software application.

16. The apparatus of claim 13, wherein the instructions further cause the processor to create, in the online services system, a test environment for performing security assessments on the software application, wherein the test environment is based on the configuration data.

17. The apparatus of claim 13, wherein the instructions further cause the processor to determine if the online services system communicates with an unauthorized computer system.

* * * * *